US012650094B2

(12) United States Patent
Iurlaro et al.

(10) Patent No.: US 12,650,094 B2
(45) Date of Patent: Jun. 9, 2026

(54) GEARBOX ASSEMBLIES WITH IDLER GEARS

(71) Applicants: General Electric Company, Cincinnati, OH (US); GE Avio S.r.l., Rivalta di Torino (IT)

(72) Inventors: Simone Iurlaro, Turin (IT); Juraj Hrubec, Prague (CZ); Andrea Piazza, Turin (IT); Michele Gravina, Milan (IT); Leonardo Coviello, Bari (IT); Daniele Pampalone, Rivalta di Torino (IT); Darek Zatorski, Fort Wright, KY (US); David M. Ostdiek, Liberty Township, OH (US)

(73) Assignees: GENERAL ELECTRIC COMPANY, Evendale, OH (US); GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 18/942,255

(22) Filed: Nov. 8, 2024

(65) Prior Publication Data

US 2025/0334079 A1     Oct. 30, 2025

(30) Foreign Application Priority Data

Apr. 24, 2024     (IT) ........................ 102024000009487

(51) Int. Cl.
*F02C 7/36*          (2006.01)
(52) U.S. Cl.
CPC ...... *F02C 7/36* (2013.01); *F05D 2260/40311* (2013.01)

(58) Field of Classification Search
CPC ......................... F02C 7/36; F05D 2260/40311
See application file for complete search history.

(56) References Cited

U.S. PATENT DOCUMENTS

| | | | | |
|---|---|---|---|---|
| 2,748,623 A | * | 6/1956 | Hill | F16H 3/60 |
| | | | | 475/143 |
| 3,120,764 A | * | 2/1964 | Berlinger, Jr. | F16H 1/36 |
| | | | | 475/338 |
| 3,136,499 A | * | 6/1964 | Kessler | B64C 11/34 |
| | | | | 244/7 C |
| 3,181,810 A | * | 5/1965 | Olson | B64C 29/0033 |
| | | | | 244/66 |
| 4,856,377 A | * | 8/1989 | Goudreau | F16H 1/28 |
| | | | | 475/331 |
| 10,227,928 B2 | | 3/2019 | Kuhne et al. | |
| 2015/0354668 A1 | * | 12/2015 | Bouwer | F16H 1/46 |
| | | | | 475/338 |
| 2021/0017911 A1 | | 1/2021 | Spruce | |
| 2021/0388770 A1 | * | 12/2021 | Hrubec | F16H 57/082 |
| 2023/0130860 A1 | | 4/2023 | Piazza et al. | |
| 2023/0358178 A1 | | 11/2023 | Desjardins | |

* cited by examiner

*Primary Examiner* — Nathaniel E Wiehe
*Assistant Examiner* — Aye S Htay
(74) *Attorney, Agent, or Firm* — Venable LLP; Duarte Y Ho; Michele V. Frank

(57) ABSTRACT

A gear assembly for use with a turbomachine comprises a sun gear, a plurality of planet gears, and a ring gear. The gear assembly is connected to an input shaft and an output shaft. The sun gear is configured to rotate about a longitudinal centerline of the gear assembly, and is driven by the input shaft. A component of the gear assembly drives the output shaft. The gear assembly further comprises an output shaft reversal mechanism configured to reverse the rotational direction of the output shaft.

20 Claims, 13 Drawing Sheets

GEARBOX ASSEMBLIES WITH IDLER GEARS

CROSS REFERENCE TO RELATED APPLICATION

This application claims the benefit of Italian Patent Application No. 102024000009487, filed on Apr. 24, 2024. The prior application is incorporated herein by reference in its entirety.

FIELD

The present subject matter relates generally to gear assemblies and, in particular, to gear assembly arrangements suitable for reversing the direction of the rotational output of the gear assembly.

BACKGROUND

Gas turbine engines generally cause fan blades to rotate in the same direction on an aircraft. In some cases, it may be desirable to provide engines rotating in different directions. However, it is difficult to reverse the rotational direction of the fan blades of a gas turbine engine without significantly altering the design of the engine or the gearbox. Accordingly, there is a need for improvements in turbomachines to allow fan blades to rotate in different directions on the same aircraft.

BRIEF DESCRIPTION OF THE DRAWINGS

A full and enabling disclosure of the preferred embodiments directed to one of ordinary skill in the art, is set forth in the specification, which makes reference to the appended figures, in which.

DETAILED DESCRIPTION

Figure 1:
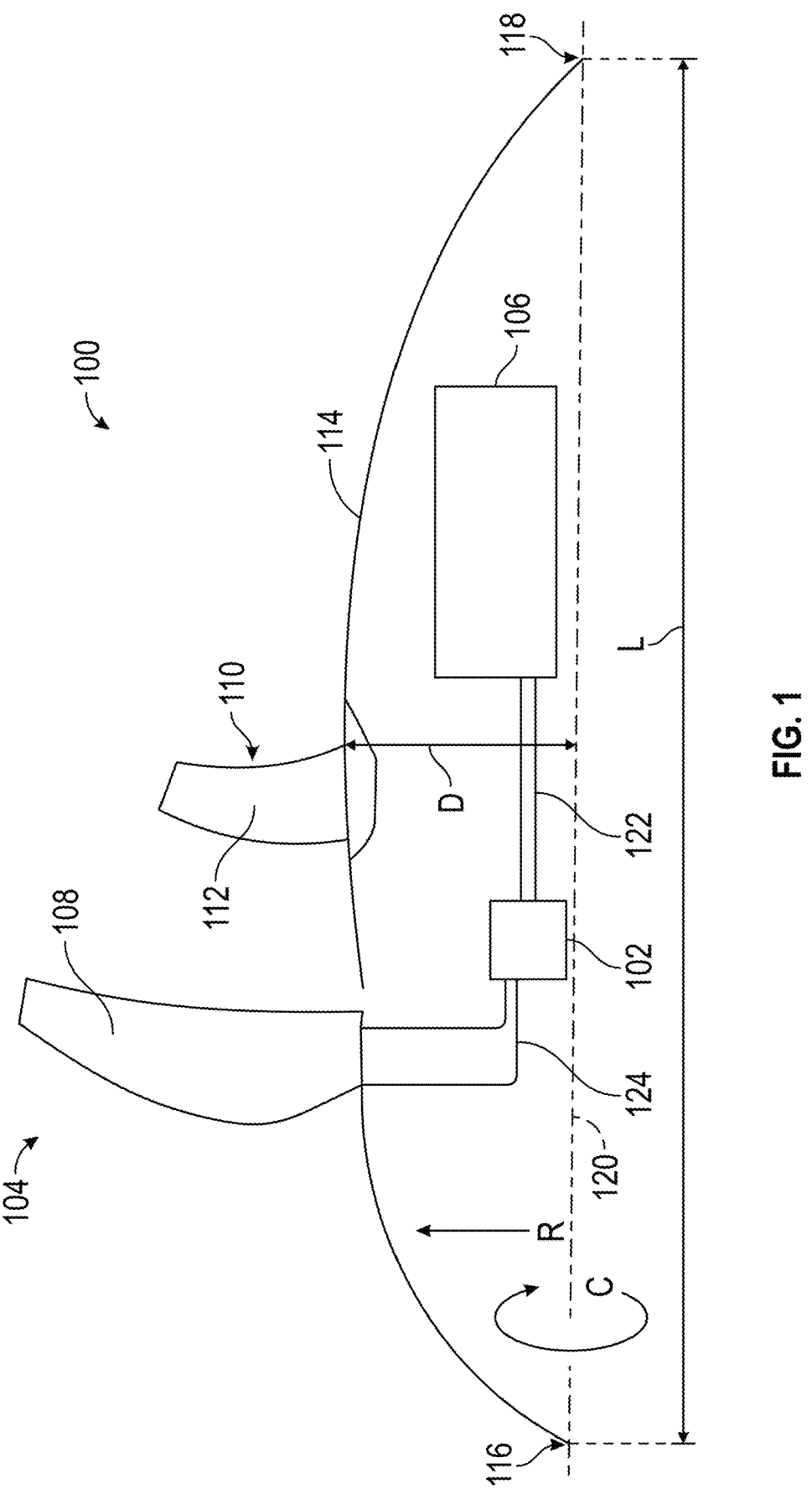
FIG. 1 is a cross-sectional schematic illustration of an exemplary embodiment of a propulsion system.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Disclosed herein are various embodiments of modifications to the gear assemblies of a rotor engine or turbofan engine. The gear assemblies disclosed herein can reverse the direction of rotation of one or more rotor engines. The gear assemblies disclosed herein can provide significant advantages over conventional systems.

For example, the gear assemblies disclosed herein may allow for the rotor engines of an aircraft to be rotated in opposite directions, reducing or eliminating one or more of several drawbacks associated with rotation of the engines in the same direction. For example, when an aircraft has engines rotating in the same direction, one of the engines may cast debris from operation towards the fuselage of the aircraft, or towards the other engine. This necessitates armoring the fuselage against possible impacts that may cause damage to one or more of the engines of the aircraft. Rotating the rotor engines in opposite direction, depending on engine location, may reduce the risk of damage from cross engine debris by causing the debris stream from all engines to flow away from other engines and from the fuselage of the aircraft. In turn, this may reduce the need to armor or shield portions of the aircraft against debris, allowing aircraft weight to be reduced, and avoid the risk of engine damage from cross-engine debris.

Rotating the rotor engines of the aircraft in opposite directions may additionally counteract the yaw forces which can occur when the aircraft engines are rotating in the same direction. The rotation of each engine can create a left or right yaw force depending on the direction in which the engines are rotating. When the engines are rotating in the same direction, these yaw forces can interact additively, causing a persistent yaw effect to the left or the right of the aircraft. When the engines are rotating in opposite directions, the yaw forces can partially or completely cancel each other out. With yaw forces eliminated or reduced, the need to provide a counteracting force from some other source may be eliminated or reduced in turn, which can improve aircraft performance and efficiency.

Furthermore, in the case of rotor engines located near the ends or tips of the wings of the aircraft, running the engines in opposite directions may allow both engines at the wing tips to be run in the inboard up rotational direction. This allows for control over the strength and direction of the wingtip vortex, which may result in improved wing efficiency.

Additionally, rotating the rotor engines of the aircraft in opposite directions may minimize aero-acoustic interactions in the cabin space in the aircraft. This may reduce the noise and discomfort caused to passengers by the operation of the rotor engines and improve the passenger experience.

By using alternative gearbox configurations, the direction of rotation can be changed prior to the booster and/or core flowpath, which minimizes the number of unique parts required, and minimizes part count, the need for retooling, the number of spare parts and modules that must be kept for engine repair, product cost, and maintenance cost. Additionally, product design flexibility may be improved.

Referring now to the drawings, FIG. 1 is an exemplary embodiment of an engine 100 including a gear assembly 102 according to aspects of the present disclosure. The engine 100 includes a fan assembly 104 driven by a core engine 106. In various embodiments, the core engine 106 is a Brayton cycle system configured to drive the fan assembly 104. The core engine 106 is shrouded, at least in part, by an outer casing 114. The fan assembly 104 includes a plurality of fan blades 108. A vane assembly 110 is extended from the outer casing 114. The vane assembly 110 including a plurality of vanes 112 is positioned in operable arrangement with the fan blades 108 to provide thrust, control thrust vector, abate or re-direct undesired acoustic noise, and/or otherwise desirably alter a flow of air relative to the fan blades 108. In some embodiments, the fan assembly 104 includes between three (3) and twenty (20) fan blades 108. In particular embodiments, the fan assembly 104 includes between ten (10) and sixteen (16) fan blades 108. In certain embodiments, the fan assembly 104 includes twelve (12) fan blades 108. In certain embodiments, the vane assembly 110 includes an equal or fewer quantity of vanes 112 to fan blades 108.

In certain embodiments, such as depicted in FIG. 1, the vane assembly 110 is positioned downstream or aft of the fan assembly 104. However, it should be appreciated that in some embodiments, the vane assembly 110 may be positioned upstream or forward of the fan assembly 104. In still various embodiments, the engine 100 may include a first vane assembly positioned forward of the fan assembly 104 and a second vane assembly positioned aft of the fan assembly 104. The fan assembly 104 may be configured to desirably adjust pitch at one or more fan blades 108, such as to control thrust vector, abate or re-direct noise, and/or alter thrust output. The vane assembly 110 may be configured to desirably adjust pitch at one or more vanes 112, such as to control thrust vector, abate or re-direct noise, and/or alter thrust output. Pitch control mechanisms at one or both of the fan assembly 104 or the vane assembly 110 may co-operate to produce one or more desired effects described above.

The core engine 106 is generally encased in outer casing 114 defining a maximum diameter. In certain embodiments, the engine 100 includes a length from a longitudinally forward end 116 to a longitudinally aft end 118. In various embodiments, the engine 100 defines a ratio of length (L) to maximum diameter (Dmax) that provides for reduced installed drag. In one embodiment, L/Dmax is at least 2. In another embodiment, L/Dmax is at least 2.5. In some embodiments, the L/Dmax is less than 5, less than 4, and less than 3. In various embodiments, it should be appreciated that the L/Dmax is for a single unducted rotor engine.

The reduced installed drag may further provide for improved efficiency, such as improved specific fuel consumption. Additionally, or alternatively, the reduced drag may provide for cruise altitude engine and aircraft operation at or above Mach 0.5. In certain embodiments, the L/Dmax, the fan assembly 104, and/or the vane assembly 110 separately or together configure, at least in part, the engine 100 to operate at a maximum cruise altitude operating speed between approximately Mach 0.55 and approximately Mach 0.85.

Referring again to FIG. 1, the core engine 106 extends in a radial direction R relative to an engine axis centerline 120. The gear assembly 102 receives power or torque from the core engine 106 through a power input source (e.g., input shaft 122) and provides power or torque to drive the fan assembly 104, in a circumferential direction C about the engine axis centerline 120, through a power output source (e.g., output shaft 124).

In certain embodiments, such as depicted in FIG. 1, the engine 100 is an un-ducted thrust producing system, such that the plurality of fan blades 108 is unshrouded by a nacelle or fan casing. As such, in various embodiments, the engine 100 may be configured as an unshrouded turbofan engine, an open rotor engine, or a propfan engine. In particular embodiments, the engine 100 is a single unducted rotor engine including a single row of fan blades 108. The engine 100 configured as an open rotor engine includes the fan assembly 104 having large-diameter fan blades 108, such as may be suitable for high bypass ratios, high cruise speeds (e.g., comparable to aircraft with turbofan engines, or generally higher cruise speed than aircraft with turboprop engines), high cruise altitude (e.g., comparable to aircraft with turbofan engines, or generally higher cruise speed than aircraft with turboprop engines), and/or relatively low rotational speeds. Cruise altitude is generally an altitude at which an aircraft levels after climb and prior to descending to an approach flight phase. In various embodiments, the engine is applied to a vehicle with a cruise altitude up to approximately 65,000 ft. In certain embodiments, cruise altitude is between approximately 28,000 ft. and approximately 45,000 ft.

Although depicted above as an unshrouded or open rotor engine in FIG. 1, it should be appreciated that the gear assemblies disclosed herein may be applied to shrouded or ducted engines, partially ducted engines, aft-fan engines, or other turbomachine configurations, including those for marine, industrial, or aero-propulsion systems. In addition, the gear assemblies disclosed herein may also be applicable to turbofan, turboprop, or turboshaft engines.

Figure 2:
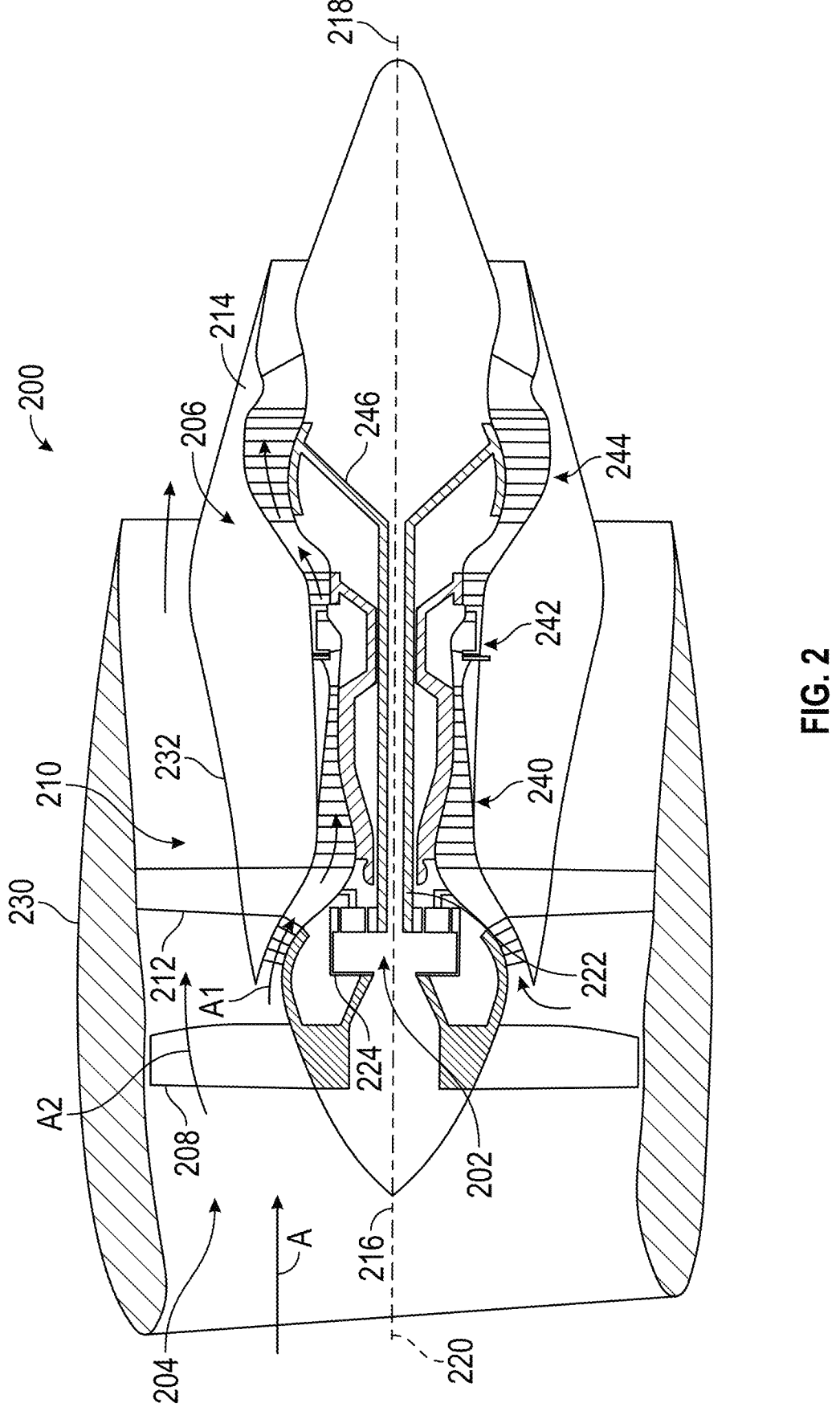
FIG. 2 is a cross-sectional schematic illustration of an exemplary embodiment of another propulsion system.

For example, FIG. 2 is a cross-sectional schematic illustration of an exemplary embodiment of an engine 200 that includes a gear assembly 202 in combination with a ducted fan propulsion system. However, unlike the open rotor configuration of FIG. 1, a fan assembly 204 and its fan blades 208 are contained within an annular fan case 230 and a vane assembly 210, including a plurality of vanes 212, extend radially between a fan cowl 232 and the inner surface of the fan case 230. As discussed above, the gear assemblies disclosed herein can provide for increased gear ratios for a fixed gear envelope (e.g., with the same size ring gear), or alternatively, a smaller diameter ring gear may be used to achieve the same gear ratios.

As shown in FIG. 2, a core engine 206 is generally encased in an outer casing 214, and has a length extending from a longitudinally forward end 216 to a longitudinally aft end 218. The exemplary core engine (for a ducted or unducted engine) can include a compressor section 240, a heat addition system 242 (e.g., combustor), and an expansion section 244 together in serial flow arrangement. The core engine 206 extends circumferentially relative to an engine centerline axis 220. The core engine 206 includes a high-speed spool that includes a high-speed compressor and a high-speed turbine operably rotatably coupled together by a high-speed shaft. The heat addition system 242 is positioned between the high-speed compressor and the high-speed turbine. Various embodiments of the heat addition system 242 include a combustion section. The combustion section may be configured as a deflagrative combustion section, a rotating detonation combustion section, a pulse detonation combustion section, or other appropriate heat addition system. The heat addition system 242 may be configured as one or more of a rich-burn system or a lean-burn system, or combinations thereof. In still various embodiments, the heat addition system 242 includes an annular combustor, a can combustor, a cannular combustor, a trapped vortex combustor (TVC), or other appropriate combustion system, or combinations thereof.

The core engine 206 can also include a booster or low-speed compressor positioned in flow relationship with the high-speed compressor. The low-speed compressor is rotatably coupled with the low-speed turbine via a low-speed shaft 246 to enable the low-speed turbine to drive the low-speed compressor. The low-speed shaft 246 is also operably connected to gear assembly 202 to provide power to the fan assembly 204 via a power input source (e.g., input shaft 222), such as described further herein.

It should be appreciated that the terms "low" and "high", or their respective comparative degrees (e.g., -er, where applicable), when used with compressor, turbine, shaft, or spool components, each refer to relative speeds within an engine unless otherwise specified. For example, a "low turbine" or "low-speed turbine" defines a component configured to operate at a rotational speed, such as a maximum allowable rotational speed, lower than a "high turbine" or "high-speed turbine" at the engine. Alternatively, unless otherwise specified, the aforementioned terms may be understood in their superlative degree. For example, a "low turbine" or "low-speed turbine" may refer to the lowest maximum rotational speed turbine within a turbine section, a "low compressor" or "low speed compressor" may refer to the lowest maximum rotational speed turbine within a compressor section, a "high turbine" or "high-speed turbine" may refer to the highest maximum rotational speed turbine within the turbine section, and a "high compressor" or "high-speed compressor" may refer to the highest maximum rotational speed compressor within the compressor section. Similarly, the low-speed spool refers to a lower maximum rotational speed than the high-speed spool. It should further be appreciated that the terms "low" or "high" in such aforementioned regards may additionally, or alternatively, be understood as relative to minimum allowable speeds, or minimum or maximum allowable speeds relative to normal, desired, steady state, etc. operation of the engine.

As discussed in more detail below, the core engine 206 includes a gear assembly that is configured to transfer power from the expansion section 244 and reduce an output rotational speed at the fan assembly 204 relative to a low-speed turbine. Embodiments of the gear assemblies depicted and described herein can allow for gear ratios suitable for large-diameter unducted fans (e.g., FIG. 1) or certain turbofans (e.g., FIG. 2). Additionally, embodiments of the gear assemblies provided herein may be suitable within the radial or diametrical constraints of the core engine within the outer casing.

The gear assemblies described herein includes a gear set for decreasing the rotational speed of the fan assembly relative to the low speed (pressure) turbine. In operation, the rotating fan blades are driven by the low speed (pressure) turbine via gear assembly such that the fan blades rotate around the engine axis centerline and generate thrust to propel the engine, and hence an aircraft on which it is mounted, in the forward direction.

Figure 5:
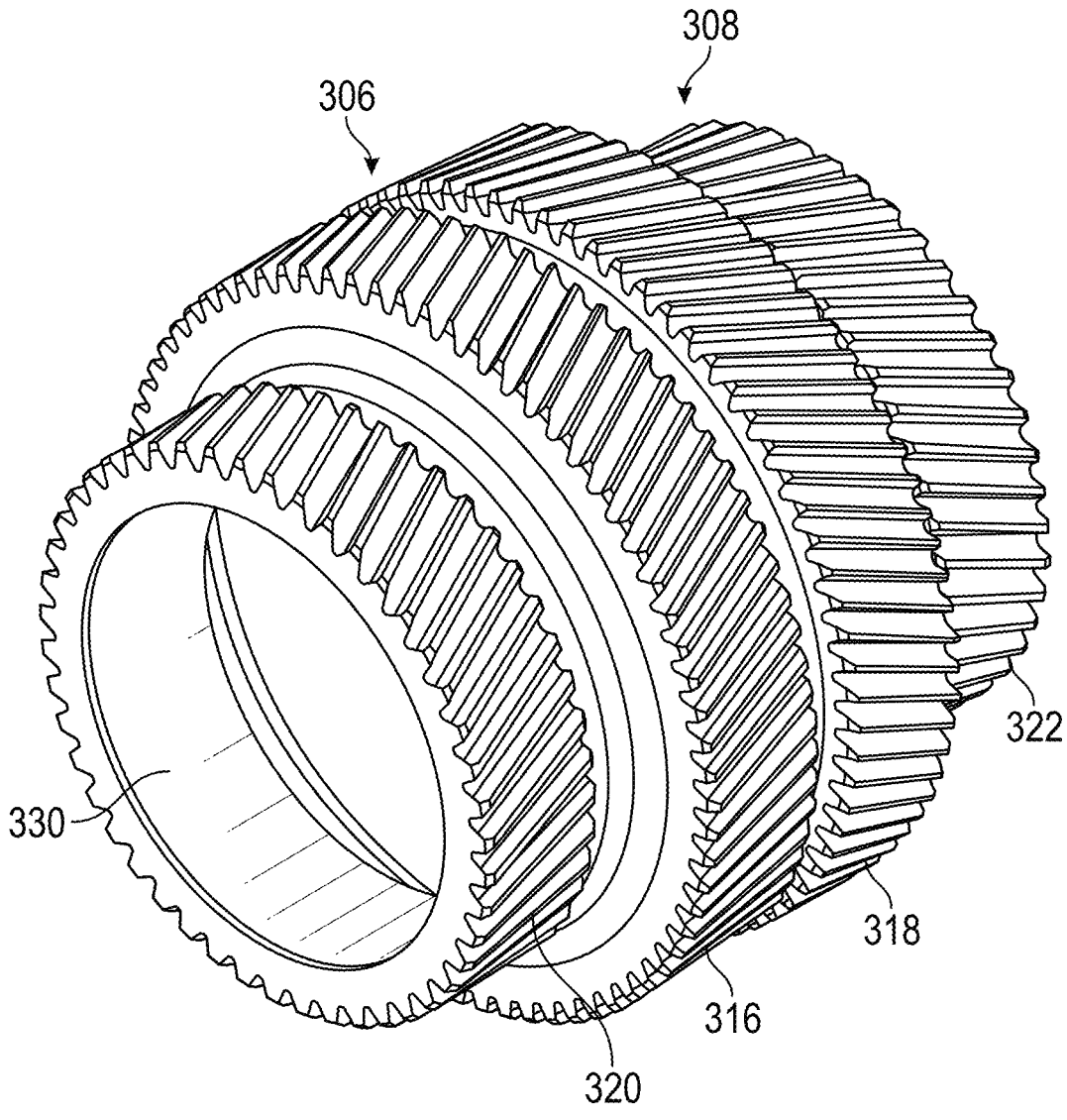
FIG. 5 is a schematic illustration of an exemplary planet gear layshaft with first and second stage planet gears.
Figure 6:
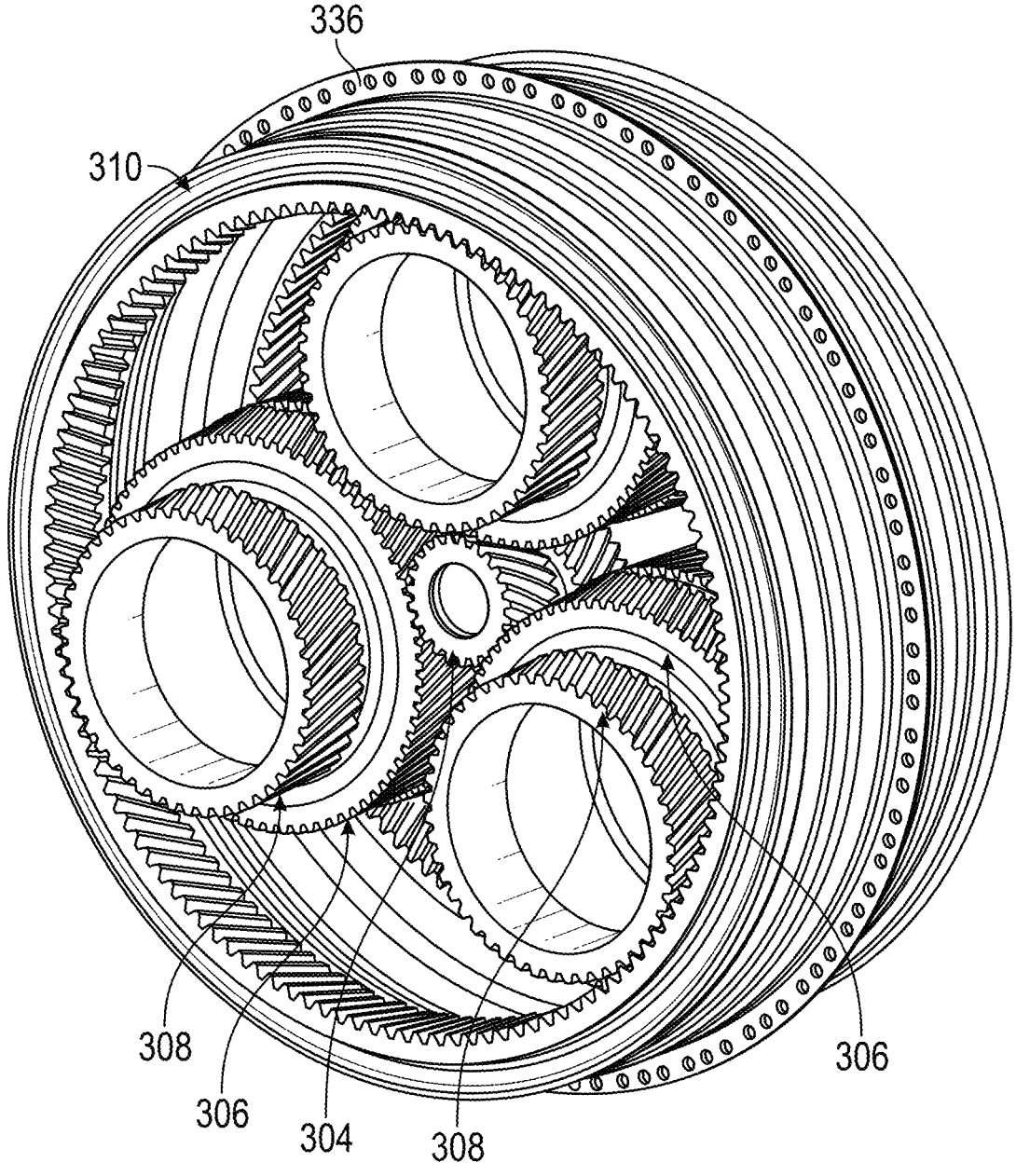
FIG. 6 is a schematic illustration of an exemplary gear assembly with compound symmetry.
Figure 7:
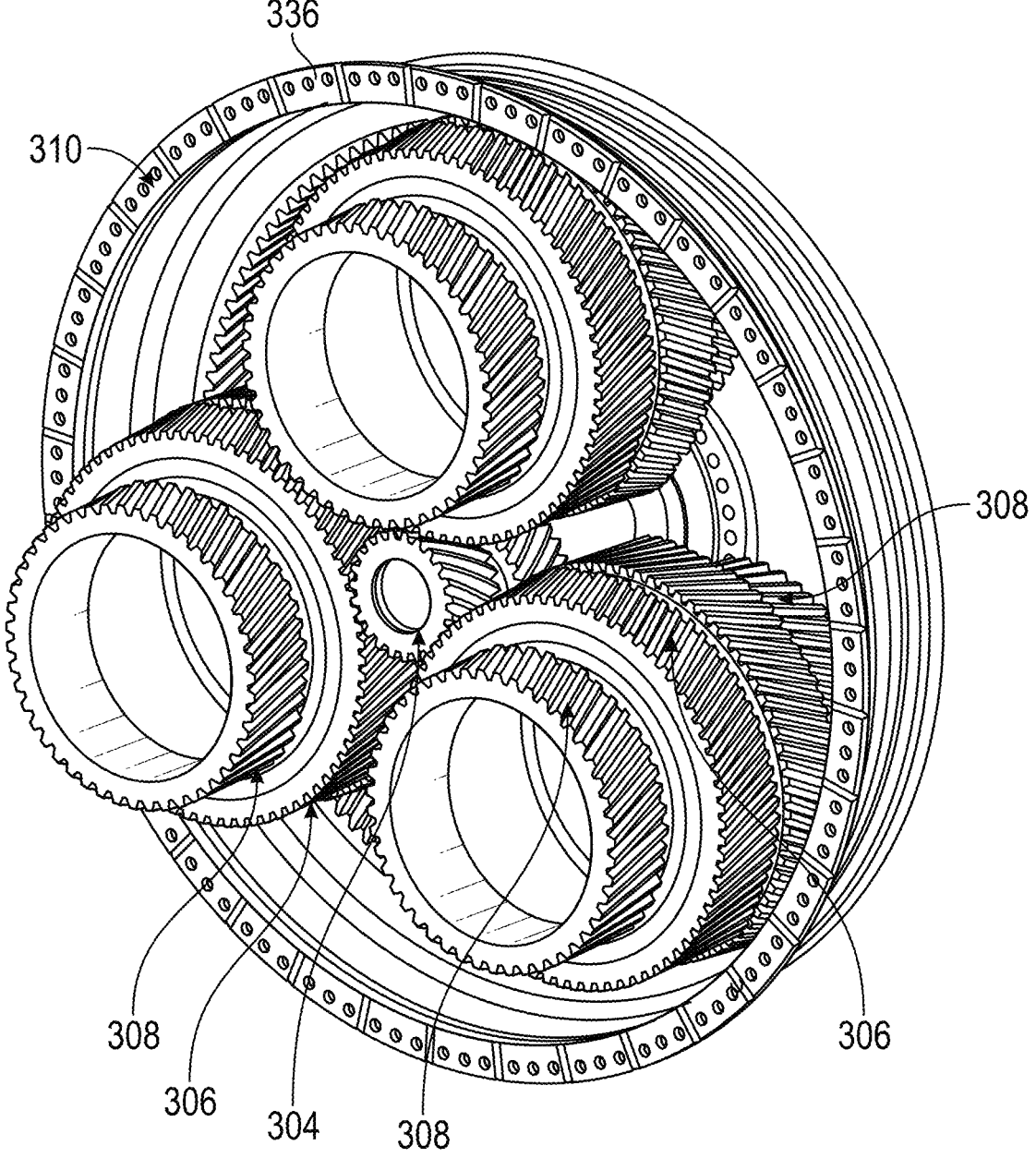
FIG. 7 is a schematic illustration of an exemplary gear assembly with compound symmetry, with a portion of a ring gear removed for clarity.

FIG. 5 illustrates one or more layshaft pins 326 and compound planet gears 306, 308. FIGS. 6 and 7 illustrate the layshaft pins 326, compound planet gears 306, 308, and a sun gear 304 with a ring gear 310 (FIG. 6) and with a portion of the ring gear removed (FIG. 7). In the embodiments shown in FIGS. 6 and 7, three compound planet gears are provided (306, 308) and the ring gear 310 comprises two halves with an interconnecting flanged portion 328. FIG. 7 also discloses a plurality of radial passages for oil scavenging.

Figure 8:
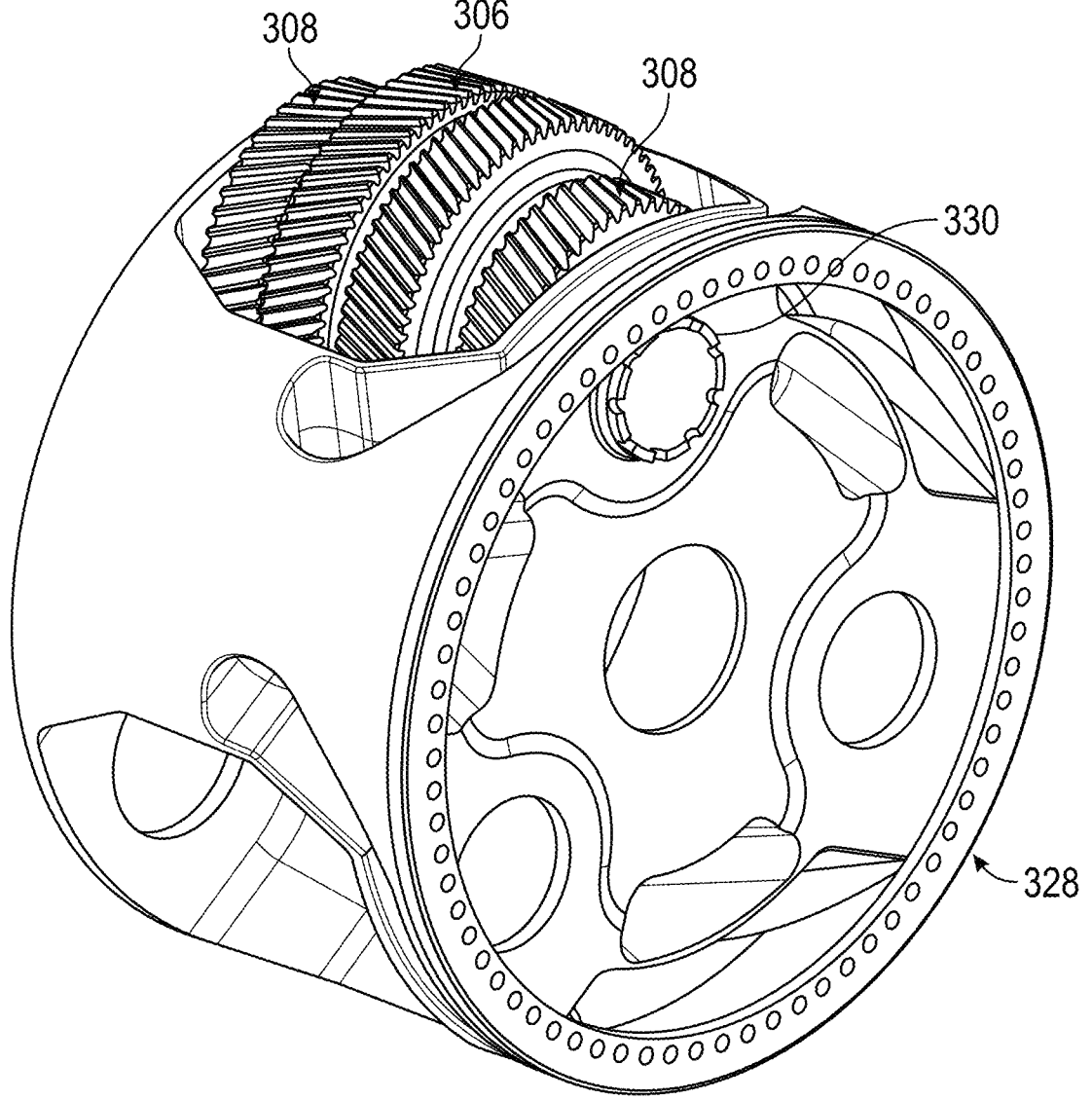
FIG. 8 is a schematic illustration of an exemplary planet carrier with a compound planet gear.
Figure 9:
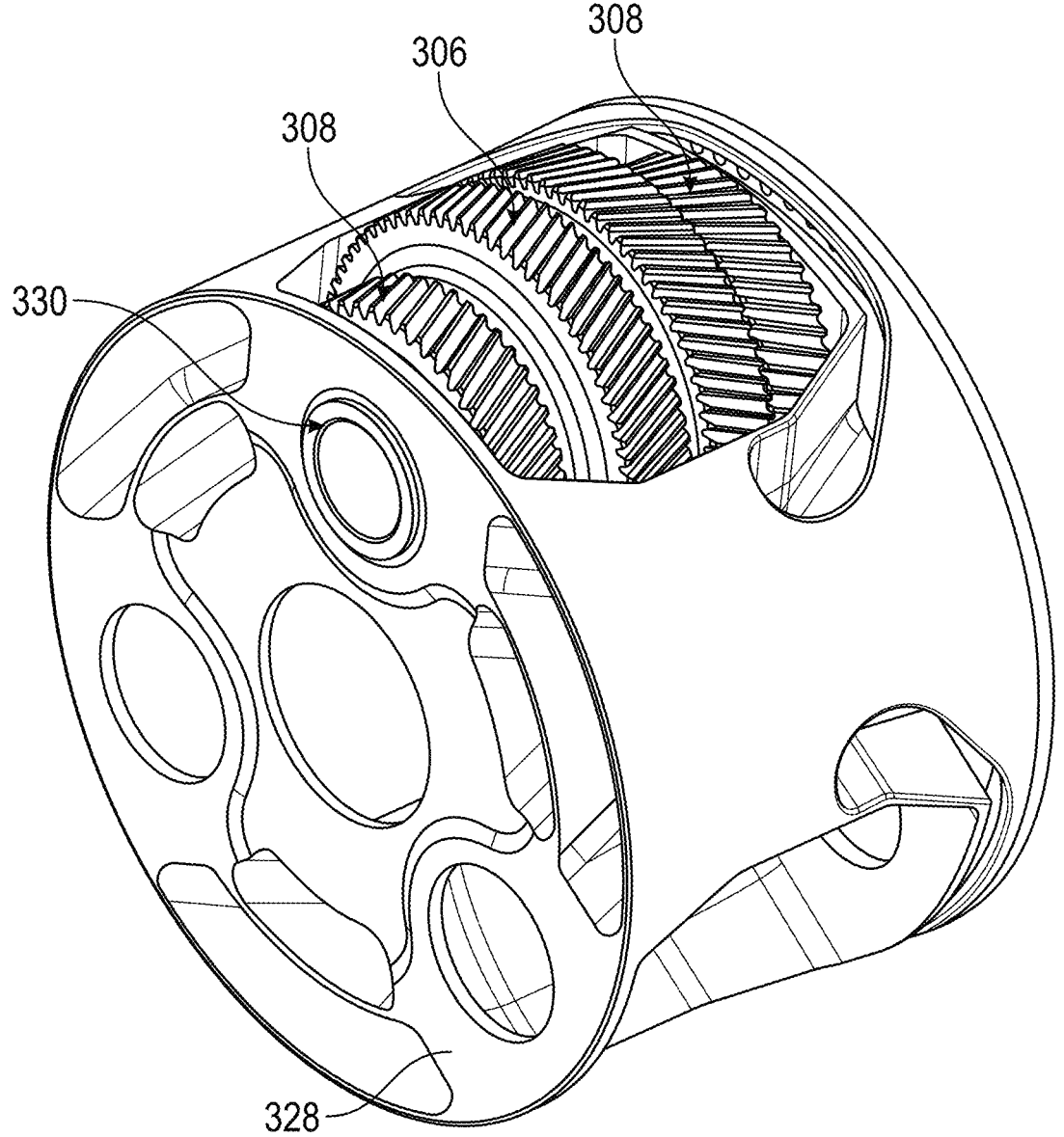
FIG. 9 is another schematic illustration of an exemplary planet carrier with a compound planet gear.

FIGS. 8 and 9 illustrate a planet gear carrier 324 with a single compound planet gear (306, 308) provided therein for clarity. The layshaft pin 326 extends through an opening in the fore and aft sides of the planet gear carrier 324. In some embodiments, the carrier can be connected to the engine frame via a flexible support system, with the flexible support system being configured to collect oil and scavenge oil via holes at a lower portion.

In some embodiments, the gear ratio split between the first and second stages can range from 40% to 60% for each stage (i.e., from 40% to 60% for the first stage and from 60% to 40% for the second stage).

As discussed above, in some embodiments, the sun gear 304, planet gears 306, 308, and ring gear 310 can be double helical gears with first and second sets of helical teeth that are inclined at an acute angle relative to each other.

Figure 3:
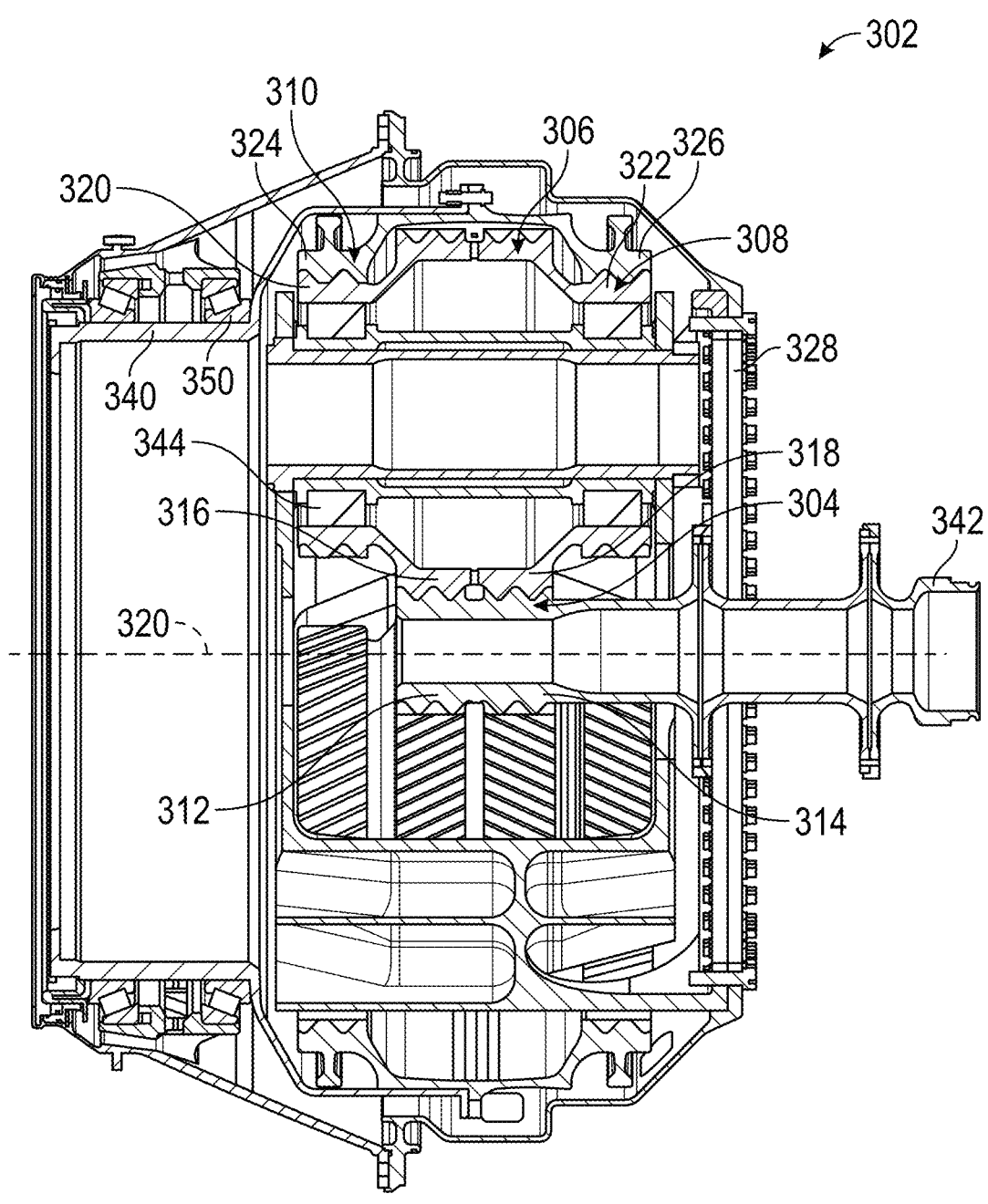
FIG. 3 is a schematic illustration of an exemplary gear assembly.
Figure 4:
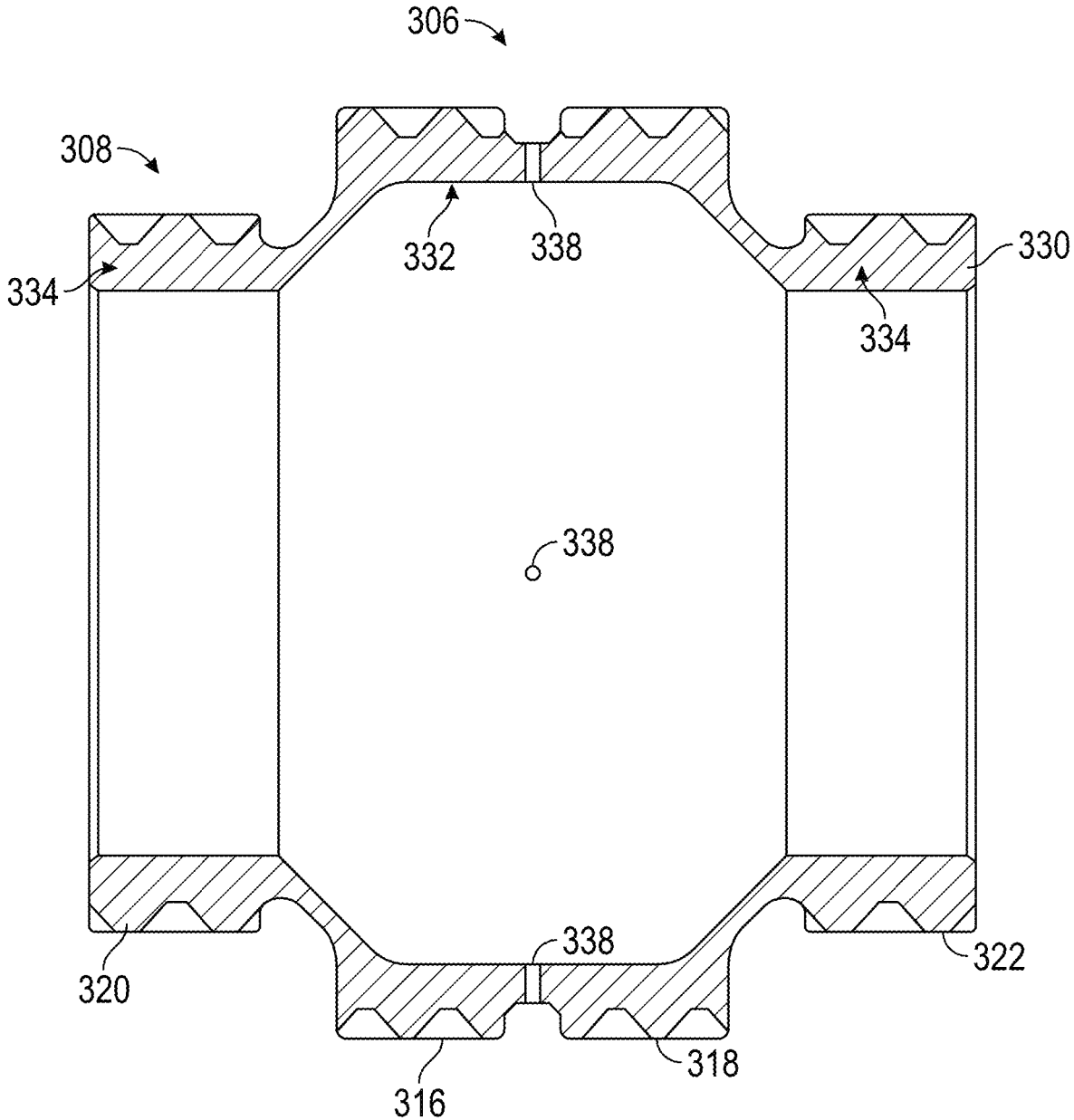
FIG. 4 is a cross-sectional view of an exemplary planet gear layshaft.

In the embodiment shown in FIG. 3, a gear assembly 302 is a star gear configuration in which the planet carrier is generally fixed (e.g., static) within the engine by support structure. The sun gear 304 is driven by an input shaft 332 (e.g., a low-speed shaft). A planet gear carrier 324 is rotatably coupled to a layshaft of the compound planet gears 306, 308, and the ring gear 310 is configured to rotate about a longitudinal engine axis centerline 340 in a circumferential direction, which in turn drives the power output source (e.g., a fan shaft) that is coupled to and configured to rotate with the ring gear to drive the fan assembly. In this embodiment, the low-speed shaft 332 rotates in a circumferential direction that is the opposite of the direction in which a fan drive shaft 330 rotates.

In other embodiments, the gear assembly can have a planetary configuration in which the ring gear is fixed (e.g., static) within the engine by a support structure. The sun gear is driven by an input shaft (i.e., low-speed shaft) and instead of the ring gear rotating, the planet carrier rotates in the same direction of the low-speed shaft rotation direction, to drive the power output source (e.g., a fan shaft) and the fan assembly.

Referring again to FIG. 3, the ring gear 310 is coupled to the fan drive shaft 330 to drive the fans. The sun gear 304 is coupled to an input power source (e.g., input shaft 332). In some embodiments, the input shaft can be integrally formed with the sun gear. The bi-helical meshes of the planet gears axially balance the load over the four (phased) gear sets of each compound planet gear. The second stage of planet gears 308 can be supported by two rows of cylindrical roller bearings 334 at the planet bore. In addition, the fan drive shaft 330 can be supported by tapered roller bearings or angular ball bearings 338, which supports the fan drive shaft 330 in an axially compact manner. In some embodiments, the roller bearings 334 can be formed from a ceramic material. In some embodiments, the roller bearings 334 can be lubricated by under-race lubrication, in which lubrication is directed under the inner race and forced out through a plurality of holes in the inner race. In some embodiments, as shown in FIG. 3, an inner supporting element of both sets of the roller bearings 334 can be a solid unique element.

In some embodiments, one of the pair of gear sets (e.g., one of the first and second gear sets, one of the third or fourth gear sets) is angularly clocked by a set amount of gear pitch relative to the other gear set. For example, the teeth of the first gear set can be angularly clocked by a first amount of the gear pitch relative to the teeth of the second gear set. The first amount can be between one fourth and one half. Similarly, the teeth of the third gear set can be angularly clocked by a second amount of the gear pitch relative to the teeth of the fourth gear set. The second amount can be between one fourth and one half.

The following are exemplary gear assemblies that can reverse the rotational direction of a turbofan engine according to the examples disclosed herein. In this way an aircraft can comprise at least one turbofan engine rotating in a first direction and at least one turbofan engine rotating in a second direction. For example, an aircraft with a pair of turbofan engines can include a first turbofan engine having fan blades rotating in a first rotational direction (e.g., clockwise or counterclockwise), and a second turbofan engine having fan blades rotating in a second rotating direction (e.g., clockwise or counterclockwise) that is opposite to the first rotational direction. For aircraft with more than two turbofan engines, the turbofan engines on the same side of the aircraft body can rotate in the same direction relative to each other, or different directions. Such assemblies may replace or be used with any of the gear assemblies previously described, and can be incorporated into any engine design, including those discussed above.

Figures 10, 11:
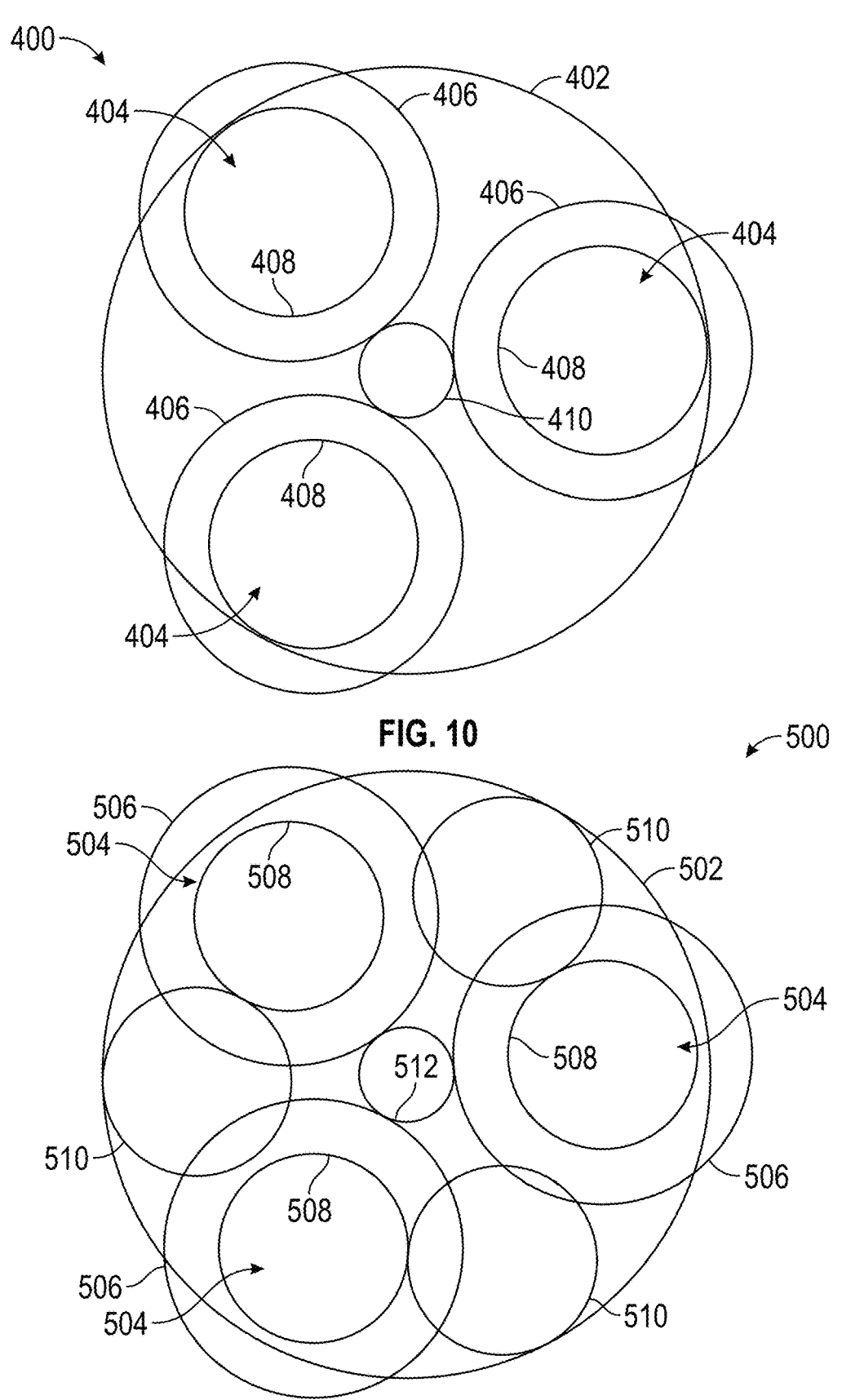
FIG. 10 is a schematic illustration of a gear assembly according to one example, having a sun gear, three compound planet gears, and a ring gear.
FIG. 11 is a schematic illustration of a gear assembly according to another example having a sun gear, three compound planet gears, three idler gears, and a ring gear.

In one embodiment, the direction of a second turbofan engine of a pair of turbofan engines can be reversed while keeping a substantially similar configuration for the engine components by introducing a plurality of idler gears to the gear assembly driving the fan blades of the turbofan engine. FIGS. 10 and 11 show two exemplary gear assembly configurations for reversing the rotational direction of one turbofan engine of a pair of turbofan engines relative to the rotational direction of the other turbofan engine.

FIG. 10 shows an epicyclic gear assembly 400 for use in the first turbofan engine of the pair of turbofan engines similar to that illustrated in FIGS. 6 and 7. Gear assembly 400 can be a star configuration with a ring gear 402, three compound planet gears 404 having a first stage 406 and a second stage 408, and a sun gear 410. In operation, sun gear 410 is driven by an input shaft driven by the core engine output of the first engine in a first rotational direction (e.g., clockwise or counterclockwise). The sun gear 410 engages with the first stage 406 of the planet gear 404, causing the first stage 406 and the second stage 408 of the planet gear to rotate in a second rotational direction (e.g., counterclockwise or clockwise) that is opposite to the first rotational direction. The second stage of the planet gear 408 engages with the ring gear 402, causing the ring gear 402 to rotate in the second rotational direction as well (e.g., counterclockwise or clockwise). Ring gear 402 is configured to drive the fan assembly of a turbofan engine such as turbofan engine 100 or 200 in the second rotational direction (e.g., clockwise or counterclockwise). In this way, the fan assembly of the first engine is driven in the opposite rotational direction of the input shaft from the core engine output of the first engine. While the example shown in FIG. 10 shows a gear assembly with three compound planet gears 404, it should be understood that a smaller number of compound planet gears, such as two compound planet gears or one compound planet gear, or a larger number of planet gears, such as four, five, or six planet gears could also be used.

The gear assembly 400 can have a gear ratio between the input and output shafts that is from 5:1 to 14:1, from 6:1 to 12:1, from 7:1 to 11:1, or from 8:1 to 10:1. In certain specific examples, the gear assembly 400 may have a gear ratio of 5:1, 6:1, 7:1, 8:1, 9:1, 10:1, 11:1, 12:1, 13:1, 14:1, or any gear ratio in between. In one example, the gear assembly has a gear ratio of 8.7:1.

FIG. 11 shows another epicyclic gear assembly 500 suitable for use with the second engine of the pair of turbofan engines. Gear assembly 500 has a ring gear 502, three compound planet gears 504 having a first stage 506 and a second stage 508, a plurality of idler gears 510, and a sun gear 512. In operation, sun gear 512 is driven by a turbine in a first rotational direction (e.g., clockwise or counterclockwise). The sun gear 512 engages with the first stage 506 of the planet gears 504, causing the first stage 506 and the second stage 508 of the planet gears to rotate in a second rotational direction (e.g., counterclockwise or clockwise) opposite to the first rotational direction. The second stage 508 of the planet gears engages the idler gears 510, causing the idler gears 510 to rotate in the first rotational direction (e.g., clockwise or counterclockwise). The idler gears 510 engage the ring gear 502, causing the ring gear 502 to rotate in the first rotational direction (e.g., clockwise or counterclockwise). Ring gear 502 is configured to drive the rotating fan blades of a turbofan engine such as turbofan engine 100 or 200 in the first rotational direction (e.g., clockwise or counterclockwise). In this way, the fan assembly of the second engine is driven in the same rotational direction as the input shaft from the core engine output of the second engine. While the example shown in FIG. 11 shows a gear assembly with three compound planet gears 504, it should be understood that a smaller number of compound planet gears, such as two compound planet gears or one compound planet gear, or a larger number of planet gears, such as four, five, or six planet gears could also be used. It should also be understood that a smaller number of idler gears, such as two idler gears or one idler gear, or a larger number of idler gears, such as four, five, or six idler gears could also be used.

Because the idler gears 510 are positioned between the second stage 508 of the planet gears 504 and the ring gear 502, they may experience cyclical fatigue in two directions, compared with the one direction experienced by the planet gears 504. To address this additional direction of cyclical stress, in some examples, the ring gear 502, the planet gears 504, the idler gears 510, and the sun gear 512, and may be made with a greater gear module (i.e., with thicker teeth) to improve the expected service life of the part before failure necessitates repair or replacement.

Like gear assembly 400, gear assembly 500 can have a gear ratio between the input and output shafts that is from 5:1 to 14:1, from 6:1 to 12:1, from 7:1 to 11:1, or from 8:1 to 10:1. In certain specific examples, the gear assembly 500 may have a gear ratio of 5:1, 6:1, 7:1, 8:1, 9:1, 10:1, 11:1, 12:1, 13:1, 14:1, or any gear ratio in between. In one example, the gear assembly has a gear ratio of between 8.7:1 to 8.9:1. Preferably, the gear ratios of gear assembly 400 and gear assembly 500 are the same, or similar (e.g., within 5% of one another).

In this way, different turbofan engines (e.g. turbofan engines 100, 200) on the same aircraft can cause the respective fan assemblies to rotate in different directions. In addition, since the gear assemblies are similar except for the idler gears and related aspects, common components can be used in each of the two gear assemblies reducing the number of parts required to assemble and maintain the engines, and the two gear assemblies can achieve the same, or similar, outputs.

Figure 12:
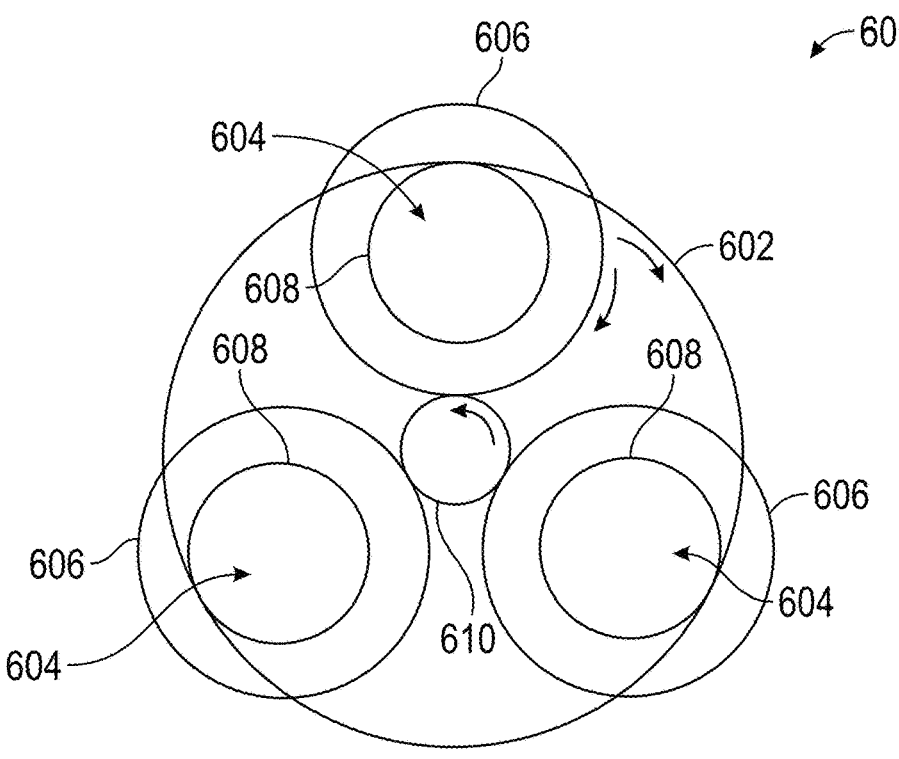
FIG. 12 is a schematic illustration of a gear assembly according to one example, having a sun gear, three compound planet gears, and a ring gear.
Figure 13:
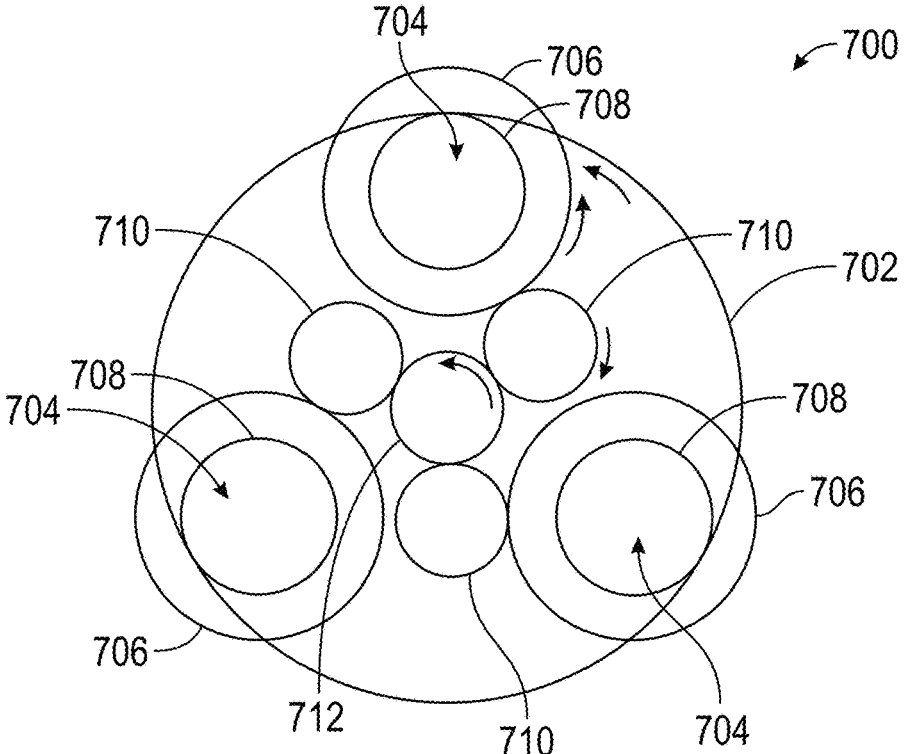
FIG. 13 is a schematic illustration of a gear assembly according to another example having a sun gear, three compound planet gears, three idler gears, and a ring gear.

FIGS. 12 and 13 show another embodiment of two exemplary gear assembly configurations for reversing the rotational direction of one turbofan engine of a pair of turbofan engines relative to the rotational direction of the other turbofan engine. As in other embodiments, the arrangement of FIGS. 12 and 13 advantageously maintain a substantially similar configuration for the engine components between the two different arrangements of FIGS. 12 and 13.

FIG. 12 shows an epicyclic gear assembly 600 for use in the first turbofan engine of the pair of turbofan engines similar to that illustrated in FIGS. 6 and 7. Gear assembly 600 can be a star configuration with a ring gear 602, three compound planet gears 604 having a first stage 606 and a second stage 608, and a sun gear 610. In operation, sun gear

610 is driven by an input shaft driven by the core engine output of the first engine in a first rotational direction (e.g., counterclockwise in this example). The sun gear 610 engages with the first stage 606 of the planet gear 604, causing the first stage 606 and the second stage 608 of the planet gear to rotate in a second rotational direction (e.g., clockwise in this example) that is opposite to the first rotational direction. The second stage of the planet gear 608 engages with the ring gear 602, causing the ring gear 602 to rotate in the second rotational direction as well (e.g., clockwise in this example). Ring gear 602 is configured to drive the fan assembly of a turbofan engine such as turbofan engine 100 or 200 in the second rotational direction. In this way, the fan assembly of the first engine is driven in the opposite rotational direction of the input shaft from the core engine output of the first engine. While the example shown in FIG. 12 shows a gear assembly with three compound planet gears 604, it should be understood that a smaller number of compound planet gears, such as two compound planet gears or one compound planet gear, or a larger number of planet gears, such as four, five, or six planet gears could also be used.

The gear assembly 600 can have a gear ratio between the input and output shafts that is from 5:1 to 14:1, from 6:1 to 12:1, from 7:1 to 11:1, or from 8:1 to 10:1. In certain specific examples, the gear assembly 600 may have a gear ratio of 5:1, 6:1, 7:1, 8:1, 9:1, 10:1, 11:1, 12:1, 13:1, 14:1, or any gear ratio in between. In one example, the gear assembly has a gear ratio of 8.7:1.

FIG. 13 shows another epicyclic gear assembly 700 suitable for use with the second engine of the pair of turbofan engines. Gear assembly 700 has a ring gear 702, three compound planet gears 704 having a first stage 706 and a second stage 708, a plurality of idler gears 710, and a sun gear 712. In operation, sun gear 712 is driven by a turbine in a first rotational direction (e.g., counterclockwise in this example). The sun gear 712 engages with the idler gears 710, causing the idler gears 710 to rotate in a second rotation direction (e.g., clockwise in this example) opposite to the first rotational direction. The idler gears 710 engage with the first stage 706 of the planet gears 704, causing the first stage 706 and the second stage 708 of the planet gears to rotate in the first rotational direction (e.g., counterclockwise in this example). The second stage 708 of the planet gears engages the ring gear 702, causing the ring gear 702 to rotate in the first rotational direction (e.g., counterclockwise in this example). Ring gear 702 is configured to drive the rotating fan blades of a turbofan engine such as turbofan engine 100 or 200 in the first rotational direction (e.g., counterclockwise in this example). In this way, the fan assembly of the second engine is driven in the same rotational direction as the input shaft from the core engine output of the second engine. While the example shown in FIG. 13 shows a gear assembly with three compound planet gears 704, it should be understood that a smaller number of compound planet gears, such as two compound planet gears or one compound planet gear, or a larger number of planet gears, such as four, five, or six planet gears could also be used. It should also be understood that a smaller number of idler gears, such as two idler gears or one idler gear, or a larger number of idler gears, such as four, five, or six idler gears could also be used.

Because the idler gears 710 are positioned between the sun gear 712 and first stage 706 of the planet gears 704, several advantages are achieved relative to conventional systems as well as other embodiments described herein. These advantage can include, for example, weight savings, reduced axial and radial envelopes, more efficient gearbox assembly and engine integration, and improved access for routing of different components across the gearbox.

Figure 14A:
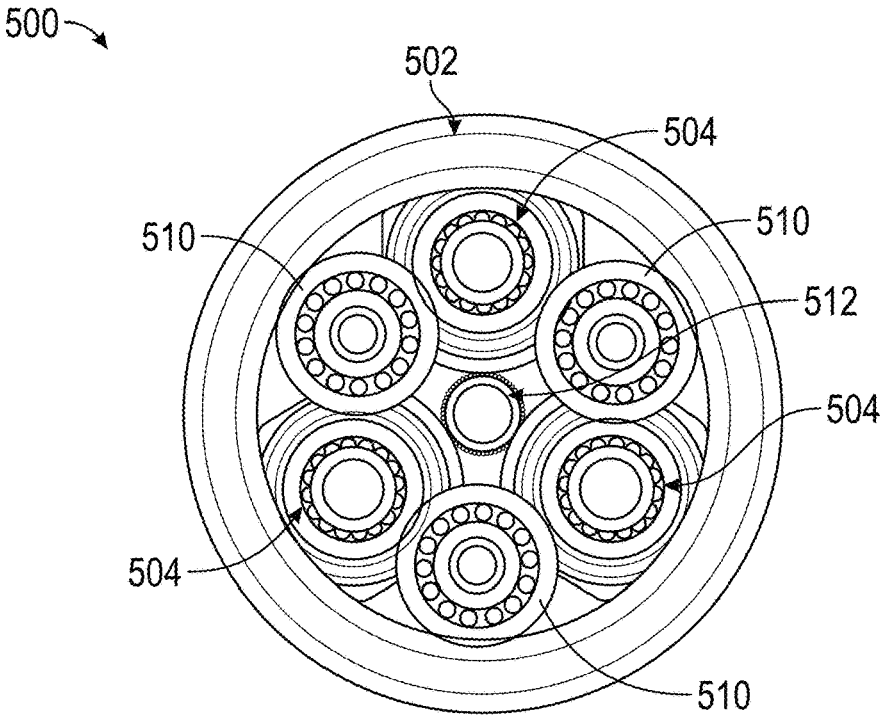
FIG. 14A is another schematic illustration showing a gear assembly of the type shown in FIG. 11.
Figure 14B:
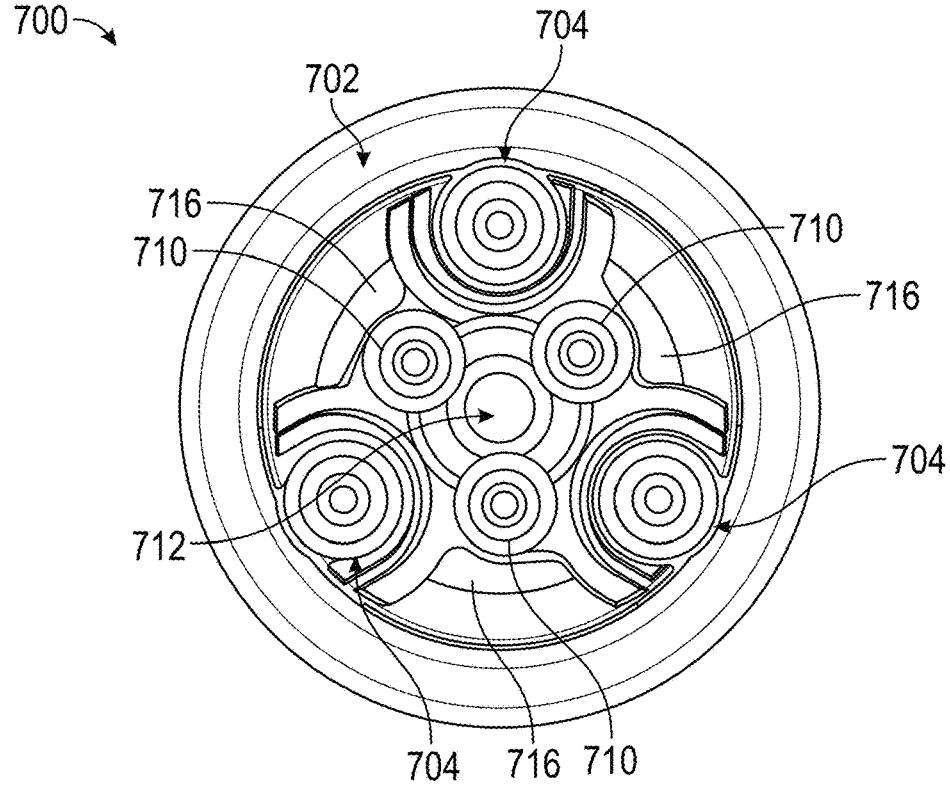
FIG. 14B is another schematic illustration showing a gear assembly of the type shown in FIG. 13.

FIGS. 14A and 14B are additional schematic illustrations showing the configuration described above with respect to FIGS. 11 and 13, respectively. As in FIG. 11, FIG. 14A illustrates the gear assembly 500 with a sun gear 512, three compound planet gears 504 having a first stage 506 and a second stage 508, and a plurality of idler gears 510 between the second stage 508 planet gears and the ring gear 502. On the other hand, FIG. 14B illustrates the gear assembly shown in FIG. 13, with a sun gear 712, a plurality of idler gears 710 between the sun gear 712 and a first stage 706 of the compound planet gears 504, and the second stage 708 of the compound planet gears 704 engaging with the ring gear 702. Relative to FIG. 14A, the gear assembly of FIG. 14B provides additional access areas 716 (e.g., pass through openings) on the static structures through which lines and other components can pass axially across the gear assembly.

As with the other idler gears described above, in some examples, the idler gears 710 and other components may be made with a greater gear module (i.e., with thicker teeth) to improve the expected service life of the part before failure necessitates repair or replacement.

Like gear assembly 600, gear assembly 700 can have a gear ratio between the input and output shafts that is from 5:1 to 14:1, from 6:1 to 12:1, from 7:1 to 11:1, or from 8:1 to 10:1. In certain specific examples, the gear assembly 700 may have a gear ratio of 5:1, 6:1, 7:1, 8:1, 9:1, 10:1, 11:1, 12:1, 13:1, 14:1, or any gear ratio in between. In one example, the gear assembly has a gear ratio of between 8.7:1 to 8.9:1. Preferably, the gear ratios of gear assembly 400 and gear assembly 700 are the same, or similar (e.g., within 5% of one another).

As described above, the gear assembly of FIGS. 13 and 14B can advantageously result in reduced axial and radial envelopes. For example, for gear ratios in the range of 5:1-12:1, the axial envelope (i.e., the maximum width) of gear assembly 700 can be between 355-395 mm, and in some embodiments, between 360-390 mm, with a corresponding radial envelope (i.e., a maximum diameter) of the gear assembly being between 500-1300 mm, and in some embodiments, between 700-1100 mm.

Figure 15:
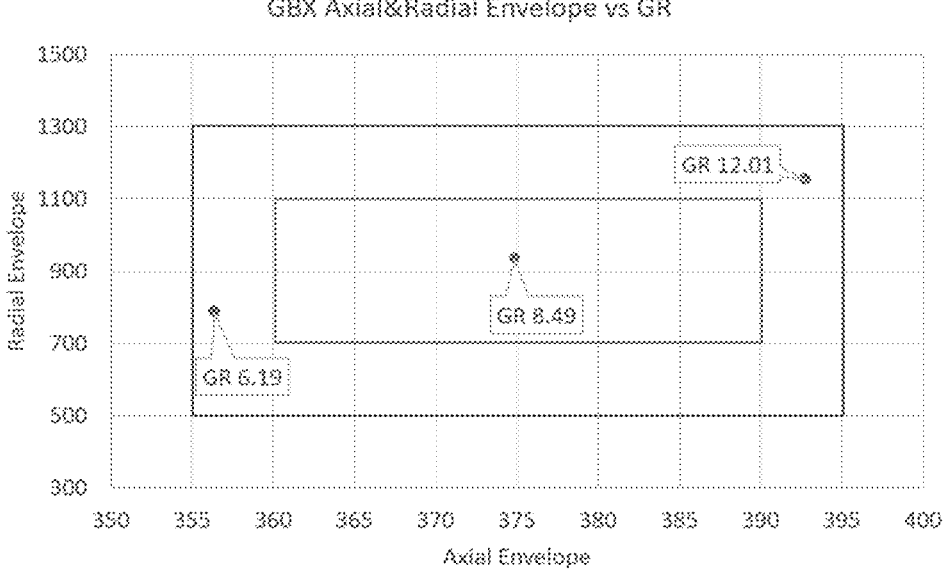
FIG. 15 shows a chart illustrating preferred ranges for axial and radial envelopes.

As shown in FIG. 15, in one example, a gear assembly 700 having a gear ratio of 6.19:1 can have an axial envelope of approximately 356 mm and a radial envelope of approximately 800 mm, a gear assembly 700 having a gear ratio of 8.49:1 can have an axial envelope of approximately 375 mm and a radial envelope of approximately 950 mm, and a gear assembly 700 having a gear ratio of 12.01:1 can have an axial envelope of approximately 393 mm and a radial envelope of approximately 1150 mm.

Referring to FIG. 15, in some embodiments, a ratio of the radial envelope (Re) to the axial envelope (Ae) for gear assemblies 700, with a gear ratio in the 5:1-12:1 range, can desirably be between 1.26 (e.g., 500/395) and 3.66 (e.g., 1300/355). For gear assemblies 700, with a gear ratio in the 7:1-10:1 range, a ratio of the radial envelope (Re) to the axial envelope (Ae), can desirably be between 1.79 (e.g., 700/390) and 3.05 (e.g., 1100/360).

Using the above novel modifications to gear assemblies, different turbofan engines (e.g., turbofan engines 100, 200) on the same aircraft can cause the respective fan assemblies to rotate in different directions. In addition, since the gear assemblies are similar except for the idler gears and related aspects, common components can be used in each of the two gear assemblies reducing the number of parts required to assemble and maintain the engines, and the two gear assemblies can achieve the same, or similar, outputs.

Advantageously, this solution allows for identical or nearly identical primary gear assemblies to be used in both the first engine and the second engine of the pair of engines since the fan rotation in one of the engines is achieved by reversing the direction of rotation of the input shaft with a secondary gear assembly (e.g., idler gears) as described herein.

When the rotational direction of one or more fan assemblies is reversed according to any of the options discussed above, several of the shortcomings of gas turbine engines can be mitigated or corrected while requiring only minimal changes to the overall engine design.

For example, the yaw forces introduced by each engine can be reversed, allowing the yaw forces of engines operating in opposite rotational directions to cancel each other out, reducing or eliminating aircraft yaw and improving operational efficiency of the aircraft. Furthermore, the ability to select rotational direction of engines located near the wingtips may allow for the attenuation of wing tip vortices, resulting in a further improvement to operational efficiency.

For open rotor engines run in opposing directions, possible debris from the engines can be projected away from the fuselage or from neighboring engines, reducing the likelihood of cross-engine debris damage. Additionally, the airflow off of all engines may be directed away from the aircraft cabin, reducing the undesirable noise and turbulence in the passenger compartment.

Because these results can be achieved with only minimal changes to the gearbox designs as disclosed herein, these advantageous results can be obtained without a significant increase in manufacture or maintenance costs for the aircraft.

Although the gear assemblies described herein are shown in use with gas turbine engines, it should be understood that the gear assemblies can be used with other powered engines, such as those powered by, for example, electric motors that rely on energy storage systems (e.g., batteries) to power the input to the gear assembly.

This written description uses examples to disclose the embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

Clause 1. A turbomachine engine comprising a fan assembly comprising a plurality of fan blades; a core engine comprising a turbine; an input shaft rotatable with the turbine and configured to rotate in a first rotational direction; and a gear assembly that receives the input shaft at a first speed and drives an output shaft coupled to the fan assembly at a second speed, the second speed being slower than the first speed, the gear assembly comprising: a sun gear coupled to the input shaft and configured to rotate in the first rotational direction; a plurality of idler gears engaged with the sun gear and being configured to rotate in a second rotational direction, the second rotational direction being opposite the first rotational direction; a plurality of planet gear layshafts that each support a first stage planet gear and a second stage planet gear, the plurality of idler gears engaged with respective ones of the first stage planet gears; and a ring gear engaged with the second stage planet gears and configured to drive the output shaft in the first rotational direction.

Clause 2. The turbomachine engine of clause 1, wherein the gear assembly has a gear ratio that is in the range of 5:1-14:1, 6:1-12:1, 7:1-10:1, and/or 8:1-9:1.

Clause 3. The turbomachine engine of any of the preceding clauses, wherein the fan assembly is a single stage of unducted fan blades.

Clause 4. The turbomachine engine of any of the preceding clauses wherein there are three planet gear layshafts.

Clause 5. The turbomachine engine of any of the preceding clauses, wherein the gear assembly has an axial envelope (Ae) and a radial envelope (Re), the gear assembly has a gear ratio that is in the range of 6:1 to 12:1, and a ratio of Re/Ae for the gear assembly is in the range of 1.26 to 3.66.

Clause 6. The turbomachine engine of any of the preceding clauses, wherein the gear assembly has an axial envelope (Ae) and a radial envelope (Re), the gear assembly has a gear ratio that is in the range of 7:1 to 10:1, and a ratio of Re/Ae for the gear assembly is in the range of 1.79 to 3.05.

Clause 7. An aircraft comprising a first turbofan engine having a first core engine, a first input shaft, a first gear assembly, and a first output shaft that is configured to drive a first fan assembly, the first core engine being configured to drive the first input shaft in a first rotational direction, and the first gear assembly being configured to drive the first output shaft in a second rotational direction that is opposite the first rotational direction so that the first fan assembly is configured to rotate in the second rotation direction; and a second turbofan engine having a second core engine, a second input shaft, a second gear assembly, and a second output shaft that is configured to drive a second fan assembly, the second core engine being configured to drive the second input shaft in the first rotational direction, and the second gear assembly being configured to drive the second output shaft in the first rotational direction so that the second fan assembly rotates in the first rotation direction, wherein the second gear assembly comprises: a sun gear coupled to the input shaft and configured to rotate in the first rotational direction; a plurality of idler gears engaged with the sun gear and being configured to rotate in the second rotational direction; a plurality of planet gear layshafts that each support a first stage planet gear and a second stage planet gear, the plurality of idler gears engaged with respective ones of the first stage planet gears; and a ring gear engaged with the second stage planet gears and configured to drive the output shaft in the first rotational direction, wherein the first fan assembly and second fan assembly are configured to rotate in opposite rotational directions with the first fan assembly being configured to rotate in the second rotational direction and the second fan assembly being configured to rotate in the first rotational direction.

Clause 8. The aircraft of clause 7, wherein the second gear assembly has a gear ratio that is in the range of 5:1-14:1, 6:1-12:1, 7:1-10:1, and/or 8:1-9:1.

Clause 9. The aircraft of any of the preceding clauses, wherein the second fan assembly is a single stage of unducted fan blades.

Clause 10. The aircraft of any of the preceding clauses, wherein the second gear assembly has three planet gear layshafts.

Clause 11. The aircraft of any of the preceding clauses, wherein the second gear assembly has an axial envelope (Ae) and a radial envelope (Re), the gear assembly has a gear ratio that is in the range of 6:1 to 12:1, and a ratio of Re/Ae for the gear assembly is in the range of 1.26 to 3.66.

Clause 12. The aircraft of any of the preceding clauses, wherein the second gear assembly has an axial envelope (Ae) and a radial envelope (Re), the gear assembly has a gear ratio that is in the range of 7:1 to 10:1, and a ratio of Re/Ae for the gear assembly is in the range of 1.79 to 3.05.

Clause 13. The aircraft of any of the preceding clauses, wherein the first gear assembly has the same gear ratio as the second gear assembly.

Clause 14. A method for reversing a rotational direction of one fan assembly of a pair of fan assemblies, comprising: driving a first fan assembly in a first rotational direction with a first input from a first core engine to a first gear assembly and a first output from the first gear assembly to the first fan assembly, wherein the first input from the first core engine rotates in a second direction that is opposite the first direction; driving a second fan assembly in the second rotational direction with a second input from a second core engine to a second gear assembly and a second output from the second gear assembly to the second fan assembly, wherein the second input from the second core engine rotates in the second direction; and reversing the second rotational direction at the second gear assembly by a reversal mechanism disposed between the second core engine and the second fan assembly, wherein the reversal mechanism comprises a plurality of idler gears positioned between a sun gear coupled to the second input and a plurality of compound planet gears.

In view of the many possible embodiments to which the principles of the disclosure may be applied, it should be recognized that the illustrated embodiments are only preferred examples of the disclosure and should not be taken as limiting the scope of the disclosure. Rather, the scope of the disclosure is defined by the following claims.

The invention claimed is:

1. A turbomachine engine comprising:
a fan assembly comprising a plurality of fan blades;
a core engine comprising a turbine;
an input shaft rotatable with the turbine and configured to rotate in a first rotational direction; and
a gear assembly that receives the input shaft at a first speed and drives an output shaft coupled to the fan assembly at a second speed, the second speed being slower than the first speed, the gear assembly comprising:
a sun gear coupled to the input shaft and configured to rotate in the first rotational direction;
a plurality of idler gears engaged with the sun gear and being configured to rotate in a second rotational direction, the second rotational direction being opposite the first rotational direction;
a plurality of planet gear layshafts that each support a first stage planet gear and a second stage planet gear, the plurality of idler gears engaged with respective ones of the first stage planet gears; and
a ring gear coupled to the second stage planet gears such that the ring gear rotates with the second stage planet gears, the ring gear configured to rotate to drive the output shaft in the first rotational direction.

2. The turbomachine engine of claim 1, wherein the gear assembly has a gear ratio that is in a range of 5:1-14:1.

3. The turbomachine engine of claim 1, wherein the gear assembly has a gear ratio that is in a range of 6:1-12:1.

4. The turbomachine engine of claim 1, wherein the gear assembly has a gear ratio that is in a range of 7:1-10:1.

5. The turbomachine engine of claim 1, wherein the gear assembly has a gear ratio that is in a range of 8:1-9:1.

6. The turbomachine engine of claim 1, wherein the fan assembly is a single stage of unducted fan blades.

7. The turbomachine engine of claim 1, wherein the plurality of planet gear layshafts includes three planet gear layshafts.

8. The turbomachine engine of claim 1, wherein the gear assembly has a gear ratio that is in a range of 6:1 to 12:1, an axial envelope (Ae), and a radial envelope (Re), a ratio of Re/Ae for the gear assembly being in a range of 1.26 to 3.66.

9. The turbomachine engine of claim 1, wherein the gear assembly has a gear ratio that is in a range of 7:1 to 10:1, an axial envelope (Ae), and a radial envelope (Re), a ratio of Re/Ae for the gear assembly being in a range of 1.79 to 3.05.

10. An aircraft comprising:

a first turbofan engine having a first core engine, a first input shaft, a first gear assembly, and a first output shaft that is configured to drive a first fan assembly, the first core engine being configured to drive the first input shaft in a first rotational direction, and the first gear assembly being configured to drive the first output shaft in a second rotational direction that is opposite the first rotational direction so that the first fan assembly is configured to rotate in the second rotational direction; and a second turbofan engine having a second core engine, a second input shaft, a second gear assembly, and a second output shaft that is configured to drive a second fan assembly, the second core engine being configured to drive the second input shaft in the first rotational direction, and the second gear assembly being configured to drive the second output shaft in the first rotational direction so that the second fan assembly rotates in the first rotational direction, wherein the second gear assembly comprises:

a sun gear coupled to the second input shaft and configured to rotate in the first rotational direction;

a plurality of idler gears engaged with the sun gear and being configured to rotate in the second rotational direction;

a plurality of planet gear layshafts that each support a first stage planet gear and a second stage planet gear, the plurality of idler gears engaged with respective ones of the first stage planet gears; and a ring gear coupled to the second stage planet gears such that the ring gear rotates with the second stage planet gears, the ring gear configured to rotate to drive the second output shaft in the first rotational direction, wherein the first fan assembly and second fan assembly are configured to rotate in opposite rotational directions with the first fan assembly being configured to rotate in the second rotational direction and the second fan assembly being configured to rotate in the first rotational direction.

11. The aircraft of claim 10, wherein the second gear assembly has a gear ratio that is in a range of 5:1-14:1.

12. The aircraft of claim 10, wherein the second gear assembly has a gear ratio that is in a range of 6:1-12:1.

13. The aircraft of claim 10, wherein the second gear assembly has a gear ratio that is in a range of 7:1-10:1.

14. The aircraft of claim 10, wherein the second gear assembly has a gear ratio that is in a range of 8:1-9:1.

15. The aircraft of claim 10, wherein the second fan assembly is a single stage of unducted fan blades.

16. The aircraft of claim 10, wherein the plurality of planet gear layshafts of the second gear assembly includes three planet gear layshafts.

17. The aircraft of claim 10, wherein the second gear assembly has a gear ratio that is in a range of 6:1 to 12:1, an axial envelope (Ae), and a radial envelope (Re), a ratio of Re/Ae for the second gear assembly is in the being in a range of 1.26 to 3.66.

18. The aircraft of claim 10, wherein the second gear assembly has a gear ratio that is in a range of 7:1 to 10:1, an axial envelope (Ae), and a radial envelope (Re), a ratio of Re/Ae for the second gear assembly being in a range of 1.79 to 3.05.

19. The aircraft of claim 10, wherein the first gear assembly has a gear ratio that is the same as a gear ratio of the second gear assembly.

20. The aircraft of claim 10, further comprising:

a third turbofan engine having a third core engine; and a fourth turbofan engine having a fourth core engine, wherein the third turbofan engine has a third fan assembly that rotates in the second rotational direction, and the fourth turbofan engine has a fourth fan assembly that rotates in the first rotational direction.

* * * * *